Patented Jan. 20, 1948

2,434,687

UNITED STATES PATENT OFFICE 2,434,687

PROCESS FOR PRODUCING VITAMIN A ACTIVE ESTERS

Norris D. Embree and Edgar M. Shantz, Rochester, N. Y., assignors to Distillation Products, Inc., Rochester, N. Y., a corporation of Delaware No Drawing. Application November 26, 1942, Serial No. 467,048

2 Claims. (Cl. 260—471)

This invention relates to improved procedure for preparing valuable chemical substances, and in particular esters of a substance convertible into materials having vitamin A activity. The invention also includes such esters as new products.

In our pending application No. 387,772, filed April 9, 1941, now Patent No. 2,414,458 dated Jan. 21, 1947, we have described a substance which has little or no vitamin A activity and which is convertible into a substance having vitamin A activity by heat treatment. This substance can be obtained by saponification of liver oils, separation of the non-saponifiable matter, and subsequent purification to increase the concentration. The substance thus produced has been found to have the following characteristics: two hydroxyl groups in the molecule, an ultraviolet absorption maximum at about 290 m$\mu$, a maximum absorption at about 428 m$\mu$ for its antimony trichloride reaction product, molecular weight of about 575 (based on actual determinations of 550 and 600), little or no vitamin A activity, convertible into a substance having vitamin A activity by heat treatment, a melting point of approximately 95–97° C., 8 double bonds in the molecule, the probable formula $C_{40}H_{58}(OH)_2$; a specific optical rotation of about $-1.35$ (determined in chloroform at 25° C. and in light having a wave length of 546.1 m$\mu$), forms a phenylazobenzoate having a melting point of approximately 153–155° C. and an extinction co-efficient in ultra violet light of approximately 700 at about 286 m$\mu$.

This invention has for its object to provide improved procedure for the preparation of vitamin A esters. Another object is to provide new substances in the form of esters which have utility, particularly in respect to their serving as a source of substances having vitamin A activity. Another object is to provide a method for preparing vitamin A esters which avoids destruction of valuable vitamin A source material. Other objects will appear hereinafter.

These and other objects are accomplished by our invention which includes esterifying a substance (hereinafter referred to as Kitol) having the following characteristics: two hydroxyl groups in the molecule, an ultraviolet absorption maximum of about 290 m$\mu$, a maximum absorption at about 428 m$\mu$ for its antimony trichloride reaction product, a molecular weight of about 575, little or no vitamin A activity and convertible into a substance having vitamin A activity by heat treatment. Our invention also includes the esters as new compositions of matter.

In the following examples and description we have given several of the preferred embodiments of our invention but they are set forth for the purpose of illustration and not in limitation thereof.

Examples of suitable source materials which can be saponified to prepare the Kitol to be esterified in accordance with our invention are liver oils, such as whale liver oil, lamb liver oil, and liver oil from northern pike. The non-saponifiable matter containing the Kitol is preferably treated to remove impurities such as sterols. It is also desirable to further purify by distillation and/or chromatographic absorption, this being particularly true when a crystalline or highly purified ester product is desired.

While Kitol has not as yet been synthesized it is obvious that synthetic Kitol or Kitol from other sources can be esterified and this is to be understood as being within the scope of our invention.

The Kitol can then be directly esterified by any of the customary esterification agents. The material is stable to esterifying agents and does not decompose when in contact therewith as is the case with vitamin A. Acid anhydrides or acid halides may be used as esterifying agents. In this way, organic acid radicals of any type, such as dinitrobenzoyl, palmityl, acetyl, etc., radicals may be introduced. Aliphatic acid esters are preferred. The esterification proceeds without difficulty and is preferably arranged as respects proportions of reactants and time to enable complete esterification. Esterification of a single hydroxyl however is to be understood as being within the scope of our invention. It is desirable to esterify in the presence of an organic solvent and a base such as pyridine. However, these materials are not necessary since one of the advantages of our invention is that Kitol is much more resistant to harsh conditions than vitamin A.

*Example 1*

200 grams of whale liver oil containing about 200,000 units of vitamin A per gram were saponified with alcoholic potassium hydroxide and extracted with ether in the usual manner. The unsaponifiable material (60 grams) was dissolved in 300 cc. of ethyl formate and the sterols removed by allowing them to crystallize first at $-30°$ C. and again at $-60°$ C. The liquid portion was distilled under vacuum to remove solvent, the residue was taken up in petroleum ether and passed into an adsorption column of aluminum oxide (Brockmann), the column was washed with two liters of petroleum ether, the bands were then removed with a spatula and the adsorbed material eluted therefrom with ether and alcohol. The band at the very top of the column contained some sterols and a small amount of oxidized material. The second band contained the Kitol. This fraction was dissolved in petroleum ether and twice adsorbed on an aluminum oxide column in the manner indicated until it appeared chromatographically pure. The final concentrate (3.5 grams) was obtained as a viscous, pale oil which at room temperature set to a yellow, glassy solid. 3.5 grams of this material were reacted with 7 grams of dinitrobenzoyl chloride in 25 cc. of ethylene dichloride and 8 cc. of pyridine by refluxing for about ½ hour. The reaction product was twice crystallized by dissolving in ethyl formate, adding ethyl alcohol until crystallization started and then cooling to −35° C. The crystals were red and had a melting point of 200° C. Analysis of the Kitol starting product indicates a probable formula $C_{40}H_{60}O_2$, and an analysis of the dinitrobenzoate ester thus produced indicates a formula

$C_{40}H_{58}O_2—(COC_6H_3)_2—(NO_2)_4$

Example 2

0.43 gram of Kitol prepared in the foregoing manner were treated with 1.0 gram of acetic anhydride dissolved in ethylene chloride and pyridine. The reaction was completed after about one-half hour of refluxing. The pyridine and excess acid were removed and the solvent was distilled off under vacuum. The residue was dissolved in petroleum ether and passed through an adsorption column of aluminum oxide. The impurities were retained on the column and the Kitol ester passed through unadsorbed. The filtrate was distilled under vacuum to remove the petroleum ether. The ester remained in the undistilled portion and showed an adsorption maximum at 290 m$\mu$ with E (1%, 1 cm.)=460.

Example 3

4.8 grams of Kitol were reacted with 9.8 grams of betanaphthoic acid in 33 ccs. of ethylene dichloride and 15 grams pyridine. The mixture was refluxed for one-half hour. The entire reaction mixture was dissolved in ethyl ether and washed with water and 5% sodium hydroxide solution. The ether solution was finally washed with water and distilled under vacuum to remove the ethyl ether. The undistilled residue was dissolved in petroleum ether and passed through an aluminum oxide column. The filtrate was reduced in volume by distillation under vacuum and cooled to −30° C. at which temperature, crystallization of Kitol beta napthoic acid ester took place. On heating of this crystalline ester to about 200° C. vitamin A beta naphthoic acid ester was obtained as judged from the elimination maximum.

The esters thus produced can be converted into the corresponding esters of vitamin A by heating, preferably to a temperature of between about 150° to 300° C. This conversion is preferably carried out under high vacuum unobstructed path distillation conditions so that the vitamin A product produced will distill and will not be harmed by heat treatment. However, heating under ordinary pressure conditions can be used to convert the ester into the corresponding ester having vitamin A activity.

An outstanding advantage of the invention is the simplicity with which vitamin A esters of any desired type can be produced. It has heretofore been necessary to directly esterify vitamin A in order to obtain vitamin A esters. Vitamin A is very sensitive to esterification agents so that the type of reactant and the reaction conditions were of necessity carefully selected. Danger of destruction by acids in connection with the formation of the new Kitol esters does not require consideration.

What we claim is:

1. The process which comprises esterifying a preparation which contains a high concentration of a chemical compound which is obtainable from liver oils and which has the following properties: (1) the probable formula $C_{40}H_{58}(OH)_2$; (2) little or no vitamin A activity; (3) convertible into vitamin A active substance by heat treatment; (4) an ultraviolet absorption maximum at approximately 290 m$\mu$; (5) reacts with antimony trichloride to give a reaction product which has an absorption maximum at approximately 428 m$\mu$; (6) a melting point of approximately 95–97° C.; (7) forms a dinitro benzoate having a melting point of approximately 200° C.; (8) forms a phenylazobenzoate having a melting point of approximately 153–155° C.; (9) a molecular weight of approximately 575; (10) 8 double bonds in its molecule; (11) a specific optical rotation of about −1.35 (determined in chloroform at 25° C., and in light having a wave length of 546.1 m$\mu$); and (12) an extinction coefficient in ultraviolet light of about 700 at approximately 286 m$\mu$; and then heating the ester thus prepared to an elevated temperature until it is converted at least partially into an ester having vitamin A activity.

2. The process which comprises in combination treating with an acylating agent a preparation which contains a high concentration of a chemical compound which is obtainable from liver oils and which has the following properties: (1) the probable formula $C_{40}H_{58}(OH)_2$; (2) little or no vitamin A activity; (3) convertible into vitamin A active substance by heat treatment; (4) an ultraviolet absorption maximum at approximately 290 m$\mu$; (5) reacts with antimony trichloride to form a reaction product which has an absorption maximum at approximately 428 m$\mu$; (6) a melting point of approximately 95°–97° C.; (7) forms a dinitro benzoate having a melting point of approximately 200° C.; (8) forms a phenylazobenzoate having a melting point of approximately 153–155° C.; (9) a molecular weight of approximately 575; (10) 8 double bonds in the molecule; (11) a specific optical rotation of about −1.35 (determined in chloroform at 25° C. and in light having a wave length of 546.1 m$\mu$) and (12) an extinction co-efficient in ultraviolet light of about 700 at approximately 286 m$\mu$ and then heating the aliphatic ester thus prepared to an elevated temperature until it is converted at least partially into an ester having vitamin A activity.

NORRIS D. EMBREE.
EDGAR M. SHANTZ.

REFERENCES CITED

The following references are of record in the file of this patent:

UNITED STATES PATENTS

| Number | Name | Date |
| --- | --- | --- |
| 2,205,925 | Hickman | June 25, 1940 |
| 2,229,173 | Hickman | Jan. 21, 1941 |